US008697027B2

(12) United States Patent
Uzhinsky et al.

(10) Patent No.: US 8,697,027 B2
(45) Date of Patent: Apr. 15, 2014

(54) METHODS AND SYSTEMS OF PRODUCING HYDROGEN AND OXYGEN FOR POWER GENERATION, AND POWER SOURCE

(75) Inventors: Ighor K. Uzhinsky, Springfield, VA (US); Gary K. Lund, Malad, ID (US); John C. Leylegian, White Plains, NY (US); Florin Girlea, Flushing, NY (US); Jason S. Tyll, Blue Point, NY (US); Lawrence G. Piper, Reading, MA (US); Marten Byl, Cambridge, MA (US); Wallace Chinitz, Melville, NY (US)

(73) Assignee: Alliant Techsystems Inc., Arlington, VA (US)

( * ) Notice: Subject to any disclaimer, the term of this patent is extended or adjusted under 35 U.S.C. 154(b) by 1076 days.

(21) Appl. No.: 12/546,047

(22) Filed: Aug. 24, 2009

(65) Prior Publication Data
US 2010/0055517 A1 Mar. 4, 2010

Related U.S. Application Data

(60) Provisional application No. 61/092,358, filed on Aug. 27, 2008.

(51) Int. Cl.
| | |
|---|---|
| C01B 3/02 | (2006.01) |
| C01B 3/04 | (2006.01) |
| C01B 3/06 | (2006.01) |
| C01B 3/24 | (2006.01) |
| C01B 3/26 | (2006.01) |
| C01B 6/00 | (2006.01) |
| H01M 8/06 | (2006.01) |
| H01M 8/10 | (2006.01) |
| H01M 8/12 | (2006.01) |

(52) U.S. Cl.
USPC ........ 423/648.1; 422/162; 423/650; 423/651; 423/657; 423/658.2; 429/416; 429/495

(58) Field of Classification Search
None
See application file for complete search history.

(56) References Cited

U.S. PATENT DOCUMENTS

| 3,574,560 A | 4/1971 | Von Sturm et al. |
| 4,000,003 A | 12/1976 | Baker et al. |

(Continued)

FOREIGN PATENT DOCUMENTS

| FR | 2 920 593 A1 | 3/2009 |
| GB | 1 230 616 | 5/1971 |

(Continued)

OTHER PUBLICATIONS

Stambouli et al, "Solid oxide fuel cells (SOFCs): a review of an environmentally clean and efficient source of energy," Available online Jun. 18, 2002, Pergamon, Renewable & Sustainable Energy Reviews, vol. 6, pp. 433-455.*

(Continued)

*Primary Examiner* — Melvin C Mayes
*Assistant Examiner* — Colin W Slifka
(74) *Attorney, Agent, or Firm* — TraskBritt

(57) ABSTRACT

Methods and systems of providing a source of hydrogen and oxygen with high volumetric energy density, as well as a power systems useful in non-air breathing engines such as those in, for example, submersible vehicles, is disclosed. A hydride reactor may be utilized in forming hydrogen from a metal hydride and a peroxide reactor may be utilized in forming oxygen from hydrogen peroxide. The high temperature hydrogen and oxygen may be converted to water using a solid oxide fuel cell, which serves as a power source. The power generation system may have an increased energy density in comparison to conventional batteries. Heat produced by exothermic reactions in the hydride reactor and the peroxide reactor may be transferred and utilized in other aspects of the power generation system. High temperature water produced during by the peroxide reactor may be used to fuel the hydride reactor.

7 Claims, 12 Drawing Sheets

(56) References Cited

U.S. PATENT DOCUMENTS

| | | | |
|---|---|---|---|
| 5,141,823 A | 8/1992 | Wright et al. | |
| 5,372,617 A | 12/1994 | Kerrebrock et al. | |
| 5,465,702 A | 11/1995 | Ferrenberg | |
| 5,858,568 A | 1/1999 | Hsu et al. | |
| 5,904,748 A | 5/1999 | Ehrensberger et al. | |
| 5,980,605 A | 11/1999 | Yao et al. | |
| 7,169,489 B2 | 1/2007 | Redmond | |
| 7,179,443 B2 | 2/2007 | Schell et al. | |
| 7,311,986 B2 | 12/2007 | Hsu | |
| 7,329,470 B2 | 2/2008 | Adams et al. | |
| 2002/0025458 A1* | 2/2002 | Faville et al. | 429/13 |
| 2002/0166286 A1* | 11/2002 | McClaine et al. | 48/197 R |
| 2004/0146458 A1* | 7/2004 | Weissman et al. | 423/651 |
| 2008/0075987 A1* | 3/2008 | Kindler et al. | 429/17 |
| 2010/0323253 A1* | 12/2010 | Fang et al. | 429/421 |

FOREIGN PATENT DOCUMENTS

| | | |
|---|---|---|
| JP | 2004-155599 A | 6/2004 |
| JP | 2004-319490 A | 11/2004 |
| WO | 02/066369 A1 | 8/2002 |

OTHER PUBLICATIONS

Carreiro, Louis G., et al., "Solid Oxide Fuel Cells in Unmanned Undersea Vehicle Applications," Paper No. 0973-BB04-07, Materials Research Society, downloaded Aug. 20, 2008.

Carreiro, Louis G., et al., "Self Contained Fuel System for Solid Oxide Fuel Cell," U.S. Appl. No. 11/208,125, filed Aug. 18, 2005.

Carreiro, Louis G., et al., "Unmanned Underwater Vehicle," NAVSEA Presentation, Sep. 12, 2006, 43 pages.

ATK, Hydrogen Peroxide/Magnesium Hydride Power Unit, Concealed Hydrogen/Oxygen Supply System (CHOSS), Dec. 12, 2006, 5 pages.

ATK, Combined Hydrogen/Oxygen Supply System Fuel Cell Power Unit, White Paper, Aug. 28, 2007, 11 pages.

ATK, Hydrogen Peroxide/Magnesium Hydride Power Unit, Combined Hydrogen/Oxygen Supply System (CHOSS) for UUV Applications, Sep. 13, 2007, 23 pages.

Goroshin, Samuel, et al., "Powdered Metals as Fuel for Hypersonic Ramjets," 37th AIAA/ASME/SAE/ASEE Joint Propulsion Conference and Exhibit, Jul. 8-11, 2001, Salt Lake City, Utah, Copyright 2001 by the American Institute of Aeronautics and Astronautics, AIAA-2001-3919, pp. 1-11.

Pal, Uday B., et al., "Emerging SOM Technology for the Green Synthesis of Metals from Oxides," JOM, Oct. 2001, pp. 32-35.

Raman, R.K., et al., "A Direct Borohydride/Hydrogen Peroxide Fuel Cell with Reduced Alkali Crossover," Fuel Cells, vol. 7, No. 3., pp. 225-231, 2007.

E. Lennon et al., "Controlled Hydrogen Peroxide Decomposition for a SOFC Oxidant with Microreactors," 2008 AICHE Spring National Meeting, 83J, Apr. 6, 2008-Apr. 10, 2008 XP002562214.

A. Krishnan et al., "Magnesium-Hydride Slurry Technology for Hydrogen Storage," Mater. Res. Soc Symp Proc, vol. 837, N5.7.1, (Nov. 28, 2004-Dec. 3, 2004) XP002562215.

K. Subramanyan et al., "Characterization and quantification of uncertainty in solid oxide fuel cell hybrid power plants," Journal of Power Sources, vol. 142, Jan. 21, 2005 (Jan. 12, 2005), pp. 103-116, XP002562293.

PCT International Search Report for Application No. PCT/US2009/054738, dated Jan. 25, 2010 (4 pages).

* cited by examiner

| Item | 100% H2O2 | 100% MgH2 | Units | Total | | H2 Total Energy | 120000 kJ/kg H2 | Paraffin Combustion Energy: 30000 kJ/kg Par |
|---|---|---|---|---|---|---|---|---|
| Propellant Weight | 18.02 | 6.89 | kg | 39.66 | | Energy Item | Value | Units |
| Volume | 12.87 | 4.75 | liters | 31.61 | | SOFC Efficiency | 0% | Unitless |
| Heat of Decomposition | 3000.00 | 10601.00 | kJ/kg | | | Thermal Energy Loss | 10% | Unitless | CO Combustion Energy: 10000 kJ/kg Par |
| Components Density | 1.22 | 1.45 | kg/liter (avg) | 1.25 | | Total Energy | 254,327 kJ | |
| Steam Heat Capacity | 2.10 | kJ/(kg*C°) | Concentrations: | | | Total Useful Therm Energy (TE) | 174,583 kJ | 3.53 kW |
| MgH2 Heat Capacity | 1.54 | kJ/(kg*C°) | H2O2 (w%) | 55% | | Total TE Dissipated | 146,327 kJ | 2.42 kW / 2.03 kW |
| H2O2 Heat of Evaporation | 1945.00 | kJ/kg | MgH2 (w%) | 100% | | Turbine Efficiency ** | 71% Unitless | El Generator: 70% |
| Total H2 Generated | 1.06 | kg | 1.3 :Plant/Fuel W-Ratio | | | Resulting System Performance Data: | | |
| Total O2 Generated | 8.48 | kg | 1.3 :Plant/Fuel V-Ratio | | | Electrical & Mech TE Converted: | 108,000 kJ | 1.50 kW |
| Total CO2 Generated | 0.00 | kg | Extra H2O2(D) for Paraffin Ox | | | FC Electrical Energy: | 0 kJ | 0.00 kW |
| Total H2O Produced | 29.06 | kg | (kg): | 0.00 | | 100% H2O2 Rate: | 0.25 :Gram/sec: | 0.46 H2O2 Solution |
| MgO Produced | 10.60 | kg | Mg(OH)2 for CO2 Sequester | | | 100% MgH2 Rate: | 0.10 :Gram/sec: | 0.10 MgH2 Slurry |
| MgCO3 Produced | 0.00 | kg | (kg): | 0.00 | | Fuel Storage Length (cm): | 51.58 | 20" Diameter: 15.60 |
| Power Unit Operational Time (Hours) | 20.00 | | 0 | Reforming Index | | Fuel Storage Length (inch): | 20.31 | 6.14 |
| Stoichiometric Basic Chemical Processes | Energy% | By-Product Comment | | | | Structures/BOP (30% from the Fuel Volume): | 6.09 | 1.84 |
| 1. 2*H2O2->2*H2O+O2+E1 | | 21% | H2O | Water | | Total (Inch): | 26.40 | 7.99 |
| 68 -> 36 + 32 | | | | 200 C° | | Min Required Electrical Power: | 0.5 kW | Weight (kg) Volume (l) |
| 2. MgH2+H2O->MgO+2*H2+E2 | | 29% | MgO | Solid MgO | | Electrical & Mechanical Power: | 1.50 kW | 51.56 41.09 |
| 26 + 18 -> 40 + 4 | | | | if T>400C° | | Useful Energy per Stored Materials: | | |
| 3. 2*H2+O2->2*H2O+E3 | | 50% | 2*H2O | Steam | | | Weight | 2.72 MJ/kg 0.76 kW-h/kg |
| 4 + 32 -> 36 (FC Energy+Steam) | | | | 200 C° | | | Volume | 3.42 MJ/liter 0.95 kW-h/l |
| 4. C25H52+38*O2->25*CO2+26*H2O+E4 | | 21% | CO2&H2O | CO2 Reacts | | Useful Energy per System: *) | | |
| 352 + 1216 ->1100 + 468 | | | | with Mg(OH)2 | | | Weight | 2.09 MJ/kg 0.58 kW-h/kg |
| 5. C25H52+25H2O->25CO+51H2 | | Combined | 25CO2& | Energy Balance | | | Volume | 2.63 MJ/liter 0.73 kW-h/l |
| | | 5&6: | 76H2 | -6.4 Mj/kg Par | | *) Estimated for Structures/BOP is 30% of Weight and 30% of Volume to Fuel (B1112) | | |
| 6. 25CO+25H2O->25CO2+25H2 | | | | | | **) Turbine Power is converted into electrical energy to provide Minimum System | | |
| 7. CO2+Mg(OH)2->MgCO3+H2O | | Exothermic | MgCO3 | Suspended in | | Electrical Power Requirement. | Overall Turbine efficiency: | 62% |
| 44 + 58 -> 84 + 13 | | Waste Heat | | Water Tank | | | | |

Baseline 1: Li-Ion Batteries
Total Energy 108,000 kJ
Li-Ion Battery System Weight (kg) Volume (l)
176.47 115.38
(.17kW-h/kg) (.26kW-h/l)

Baseline Unit's Electric Power: 1.50 kWt
Power System Operational Time: 20.00 hours
Useful Energy per System

| | Weight | 0.61 MJ/kg | 0.17 kW-h/kg |
| | Volume | 0.94 MJ/liter | 0.26 kW-h/liter |

Baseline 2: Liquid Hydrogen/Liquid Oxygen/PEM FC Power Unit
LH2/LO2 System: Weight Volume Density
kilogram liters kg/liter Baseline Unit's Electric Power 1.50 kWt
PEM FC Efficiency 50%
FC Energy 108,000 kj

| Liquid Oxygen | 14.40 | 12.63 | 1.14 |
| Liquid Hydrogen | 1.80 | 25.71 | 0.07 |
| Total Stored Fuel: | 16.20 | 38.35 | |

Useful Energy per Stored Materials (Oxygen and Hydrogen)
Weight 6.67 MJ/kg 1.85 kW-h/kg
Volume 2.82 MJ/liter 0.78 kW-h/liter

*FIG. 7*

| Item | 100% H2O2 | 100% MgH2 | Units | Total | | | System Energy Efficiency: | | 38% |
|---|---|---|---|---|---|---|---|---|---|
| Propellant Weight | 27.65 | 4.80 | kg | 57.13 | | H2 Total Energy | 120000 kJ/kg H2 | Paraffin Combustion Energy: | 30000 kJ/kg Par |
| Volume | 19.75 | 3.31 | liters | 46.61 | | Energy Item | Value | Units | |
| Heat of Decomposition | 3000.00 | 10601.00 | kJ/kg | | | SOFC Efficiency | 0% | Unitless | CO Combustion Energy: |
| Components Density | 1.22 | 1.27 | kg/liter (avg) | 1.23 | | Thermal Energy Loss | 10% | Unitless | 10000 kJ/kg Par |
| Steam Heat Capacity | 2.10 kJ/(kg*C°) | | Concentrations: | | | Total Energy | 284,142 kJ | | 3.95 kW |
| MgH2 Heat Capacity | 1.54 kJ/(kg*C°) | | H2O2 (w%) | 55% | | Total Useful Therm Energy (TE) | 174,583 kJ | | 2.42 kW |
| H2O2 Heat of Evaporation | 1945.00 kJ/kg | | MgH2 (w%) | 70% | | Total TE Dissipated | 176,142 kJ | | 2.45 kW |
| Total H2 Generated | 0.74 | kg | 1.3 :Plant/Fuel W-Ratio | | | Turbine Efficiency **) | 71% | Unitless | El Generator: 70% |
| Total O2 Generated | 13.01 | kg | 1.3 :Plant/Fuel V-Ratio | | | Resulting System Performance Data: | | | |
| Total CO2 Generated | 6.43 | kg | Extra H2O2(D) for Paraffin Ox | | | Electrical & Mech TE Converted: | 108,000 kJ | | 1.50 kW |
| Total H2O Produced | 45.95 | kg | (kg): | | | FC Electrical Energy: | 0 kJ | | 0.00 kW |
| MgO Produced | 7.38 | kg | Mg(OH)2 for CO2 Sequester | | | 100% H2O2 Rate: | 0.38 | :Gram/sec: | 0.70 H2O2 Solution |
| MgCO3 Produced | 12.27 | kg | (kg): | 8.47 | | 100% MgH2 Rate: | 0.07 | :Gram/sec: | 0.10 MgH2 Slurry |
| Power Unit Operational Time (Hours) | 20.00 | | Reforming Index | 0 | | Fuel Storage Length (cm): | 76.06 | 20" Diameter: | 23.01 |
| Stoichiometric Basic Chemical Processes | Energy% | By-Product | Comment | | | Fuel Storage Length (Inch): | 29.94 | | 9.06 |
| 1. 2*H2O2->2*H2O+O2+E1 | 29% | H2O | Water | | | Structures/BOP (30% from the Fuel Volume): | 8.98 | | 2.72 |
| 68 -> 36 + 32 | | | 200 C° | | | Total (Inch): | 38.93 | | 11.78 |
| 2. MgH2+H2O->MgO+2*H2+E2 | 18% | MgO | Solid MgO | | | Min Required Electrical Power: | 0.5 | kW | Weight (kg) | Volume (l) |
| 26 + 18 -> 40 + 4 | | | if T>400C° | | | Electrical & Mechanical Power: | 1.50 | kW | 82.74 | 60.59 |
| 3. 2*H2+O2->2*H2O+E3 | 31% | 2*H2O | Steam | | | Useful Energy per Stored Materials: | | | | |
| 4 + 32 -> 36 (FC Energy+Steam) | | | 200 C° | | | | Weight | 1.89 MJ/kg | 0.53 kW-h/kg |
| 4. C25H52+38*O2->25*CO2+26*H2O-E4 | 22% | CO2&H2O | CO2 Reacts | | | | Volume | 2.32 MJ/liter | 0.64 kW-h/l |
| 352 + 1216 ->1100 + 468 | | | with Mg(OH)2 | | | Useful Energy per System: *) | | | |
| 5. C25H52+25H2O->25CO2+51H2 | Combined | 25CO2& | Energy Balance | | | | Weight | 1.31 MJ/kg | 0.36 kW-h/kg |
| | 58% | 76H2 | -6.4 MJ/kg Par | | | | Volume | 1.78 MJ/liter | 0.50 kW-h/l |
| 6. 25CO+25H2O->25CO2+25H2 | | | | | | *) Estimated for Structures/BOP is 30% of Weight and 30% of Volume to Fuel (B1112) | | | |
| 7. CO2+Mg(OH)2->MgCO3+H2O | Exothermic | MgCO3 | Suspended in | | | **) Turbine Power is converted into electrical energy to provide Minimum System | | | |
| 44 + 58 -> 84 + 13 | Waste Heat | | Water Tank | | | Electrical Power Requirement. | Overall Turbine efficiency: | | 62% |

Baseline 1: Li-Ion Batteries
Total Energy  108,000 kJ  30 kW-h       Baseline Unit's Electric Power:  1.50 kWt
Li-Ion Battery System Weight (Kg)     Volume (l)       Power System Operational Time:  20.00 hours
                176.47    115.38
                (.17kW-h/kg)  (.26kW-h/l)             Useful Energy per System
                                                        Weight    0.61   MJ/kg    0.17 kW-h/kg
                                                        Volume    0.94   MJ/liter 0.26 kW-h/liter Baseline 2: Liquid Hydrogen/Liquid Oxygen/PEM FC Power Unit
LH2/LO2 System:   Weight    Volume   Density            Baseline Unit's Electric Power   1.50 kWt
                 kilogram   liters   kg/liter               PEM FC Efficiency            50%
Liquid Oxygen      14.40    12.63    1.14                   FC Energy                    108,000 kj
Liquid Hydrogen     1.80    25.71    0.07
Total Stored Fuel: 16.20    38.35              Useful Energy per Stored Materials (Oxygen and Hydrogen)
                                                        Weight    6.67   MJ/kg     1.85 kW-h/kg
                                                        Volume    2.82   MJ/liter  0.78 kW-h/liter

*FIG. 8*

| Item | 100% H2O2 | 100% MgH2 | Units | Total | | | | System Energy Efficiency: | 38% |
|---|---|---|---|---|---|---|---|---|---|
| Propellant Weight | 23.92 | 4.15 | kg | 49.42 | | H2 Total Energy | 120000 kJ/kg H2 | Paraffin Combustion Energy: | 30000 kJ/kg Par |
| Volume | 17.09 | 2.86 | liters | 40.32 | | Energy Item | Value Units | | 10000 kJ/kg Par |
| Heat of Decomposition | 3000.00 | 10601.00 | kJ/kg | | | SOFC Efficiency | 0% Unitless | CO Combustion Energy: | |
| Components Density | 1.22 | 1.27 | kg/liter (avg) | 1.23 | | Thermal Energy Loss | 10% Unitless | | |
| Steam Heat Capacity | 2.10 | kJ/(kg*C°) | Concentrations: | | | Total Energy | 284,632 kJ | | 3.95 kW |
| MgH2 Heat Capacity | 1.54 | kJ/(kg*C°) | H2O2 (w%) | 55% | | Total Useful Therm Energy (TE) | 174,583 kJ | | 2.42 kW |
| H2O2 Heat of Evaporation | 1945.00 | kJ/kg | MgH2 (w%) | 70% | | Total TE Dissipated | 176,632 kJ | | 2.45 kW |
| | | | | | | Turbine Efficiency **) | 71% Unitless | El Generator: | 70% |
| Total H2 Generated | 1.41 | kg | 1.3 :Plant/Fuel W-Ratio | | | Resulting System Performance Data: | | | |
| Total O2 Generated | 11.26 | kg | 1.3 :Plant/Fuel V-Ratio | | | Electrical & Mech TE Converted: | 108,000 kJ | | 1.50 kW |
| Total CO2 Generated | 5.56 | kg | Extra H2O2(D) for Paraffin Ox | | | FC Electrical Energy: | 0 kJ | | 0.00 kW |
| Total H2O Produced | 39.75 | kg | (kg): | 0.00 | | 100% H2O2 Rate: | 0.38 :Gram/sec: | 0.70 H2O2 Solution | 19.90 |
| MgO Produced | 6.39 | kg | Mg(OH)2 for CO2 Sequester | | | 100% MgH2 Rate: | 0.07 :Gram/sec: | 0.10 MgH2 Slurry | 7.84 |
| MgCO3 Produced | 10.62 | kg | (kg): | 7.33 | | Fuel Storage Length (cm): | 65.80 20" Diameter: | | 2.35 |
| Power Unit Operational Time (Hours) | 20.00 | | Energy% | Reforming Index | | Fuel Storage Length (Inch): | 25.90 | | 10.19 |
| Stoichiometric Basic Chemical Processes | | | | By-Product Comment | | Structures/BOP (30% from the Fuel Volume): | 7.77 | | |
| 1. 2*H2O2->2*H2O+O2+E1 | | | 25% | H2O Water | | Total (Inch): | 33.68 | | |
| 68 -> 36 + 32 | | | | 200 C° | | | 11" Diameter: | Weight (kg) | Volume (l) |
| 2. MgH2+H2O->MgO+2*H2+E2 | | | 15% | MgO Solid MgO | | Min Required Electrical Power: | 0.5 kW | | 71.58 52.42 |
| 26 + 18 -> 40 + 4 | | | | if T>400C° | | Electrical & Mechanical Power: | 1.50 kW | | |
| 3. 2*H2+O2->2*H2O+E3 | | | 59% | 2*H2O Steam | | Useful Energy per Stored Materials: | | | |
| 4 + 32 -> 36 (FC Energy+Steam) | | | | 200 C° | | Weight | 2.19 MJ/kg | | 0.61 kW-h/kg |
| 4. C25H52+38*O2->25*CO2+26*H2O+E4 | | | 0% | CO2&H2O | | Volume | 2.68 MJ/liter | | 0.74 kW-h/l |
| 352 + 1216->1100 + 468 | | | | CO2 Reacts with Mg(OH)2 | | Useful Energy per System: *) | | | |
| 5. 25H52+25H2O->25CO+51H2 | | | Combined | Energy Balance | | Weight | 1.51 MJ/kg | | 0.42 kW-h/kg |
| 5&6: | | | | -6.4 MJ/kg Par | | Volume | 2.06 MJ/liter | | 0.57 kW-h/l |
| 6. 25CO+25H2O->25CO2+25H2 | | | 25CO2&8 76H2 | | | *) Estimated for Structures/BOP is 30% of Weight and 30% of Volume to Fuel (B1/B2) | | | |
| 7. CO2+Mg(OH)2->MgCO3+H2O | | | Exothermic | MgCO3 Suspended in | | **) Turbine Power is converted into electrical energy to provide Minimum System | | | |
| 44 + 58 -> 84 + 13 | | | Waste Heat | Water Tank | | Electrical Power Requirement. | Overall Turbine efficiency: | | 62% |

Baseline 1: Li-Ion Batteries

| Total Energy | 108,000 kJ | | | | 30 kW-h | Baseline Unit's Electric Power: | 1.50 kWt |
|---|---|---|---|---|---|---|---|
| Li-Ion Battery System Weight (kg) | Volume (l) | | | | | Power System Operational Time: | 20.00 hours |
| 176.47 | 115.38 | | | | | Useful Energy per System | |
| (.17kW-h/kg) | (.26kW-h/l) | | | | | Weight | 0.61 MJ/kg | 0.17 kW-h/kg |
| | | | | | | Volume | 0.94 MJ/liter | 0.26 kW-h/liter |

Baseline 2: Liquid Hydrogen/Liquid Oxygen/PEM FC Power Unit

| LH2/LO2 System: | Weight | Volume | Density | | | Baseline Unit's Electric Power | 1.50 kWt |
|---|---|---|---|---|---|---|---|
| | kilogram | liters | kg/liter | | | PEM FC Efficiency | 50% |
| Liquid Oxygen | 14.40 | 12.63 | 1.14 | | | FC Energy | 108,000 kj |
| Liquid Hydrogen | 1.80 | 25.71 | 0.07 | | | Useful Energy per Stored Materials (Oxygen and Hydrogen) | |
| Total Stored Fuel: | 16.20 | 38.35 | | | | Weight | 6.67 MJ/kg | 1.85 kW-h/kg |
| | | | | | | Volume | 2.82 MJ/liter | 0.78 kW-h/liter |

*FIG. 9*

| Item | 100% H2O2 | 100% MgH2 | Units | | Total | H2 Total Energy | 120000 kJ/kg H2 | Paraffin Combustion Energy: | 30000 kJ/kg Par |
|---|---|---|---|---|---|---|---|---|---|
| Propellant Weight | 21.53 | 3.74 | kg | | 44.48 | Energy Item | Value | Units | CO Combustion Energy: |
| Volume | 15.38 | 2.58 | liters | | 36.29 | SOFC Efficiency | 50% | Unitless | 10000 kJ/kg Par |
| Heat of Decomposition | 3000.00 | 10601.00 | kJ/kg | | | Thermal Energy Loss | 10% | Unitless | |
| Components Density | 1.22 | 1.27 | kg/liter (avg) | | 1.23 | Total Energy | 221,231 kJ | | 3.07 kW |
| Steam Heat Capacity | 2.10 | kJ/(kg*C°) | Concentrations: | | | Total Useful Therm Energy (TE) | 104,885 kJ | 55% | 1.46 kW |
| MgH2 Heat Capacity | 1.54 | kJ/(kg*C°) | H2O2 (w%) | | | Total TE Dissipated | 113,2317 kJ | | 1.57 kW |
| H2O2 Heat of Evaporation | 1945.00 | kJ/kg | MgH2 (w%) | | 70% | Turbine Efficiency** | 71% | Unitless | El Generator: 70% |
| | | | | | | Resulting System Performance Data: | | | |
| Total H2 Generated | 0.57 | kg | 1.3 :Plant/Fuel W-Ratio | | | Electrical & Mech TE Converted: | 73,507 kJ | | 1.02 kW |
| Total O2 Generated | 10.13 | kg | 1.3 :Plant/Fuel V-Ratio | | | FC Electrical Energy: | 34,493 kJ | | 0.48 kW |
| Total CO2 Generated | 5.00 | kg | Extra H2O2(D) for Paraffin Ox | | | | | | |
| Total H2O Produced | 35.78 | kg | (kg): | | 21.37 | 100% H2O2 Rate: | 0.30 | :Gram/sec: | 0.54 H2O2 Solution |
| MgO Produced | 5.75 | kg | Mg(OH)2 for CO2 Sequester | | | 100% MgH2 Rate: | 0.05 | :Gram/sec: | 0.07 MgH2 Slurry |
| MgCO3 Produced | 9.55 | kg | (kg): | | 8.60 | Fuel Storage Length (cm): | 11" Diameter: | 59.22 | 20" Diameter: 17.91 |
| Power Unit Operational Time (Hours) | 20.00 | | 0 | Reforming Index | | Fuel Storage Length (Inch): | | 23.31 | 7.05 |
| Stoichiometric Basic Chemical Processes | Energy% | By-Product | Comment | | | Structures/BOP (30% from the Fuel Volume): | | 6.99 | 2.12 |
| 1. 2*H2O2->2*H2O+O2+E1 | 29% | H2O | Water | | | Total (Inch): | | 30.31 | 9.17 |
| 68 -> 36 + 32 | | | 200 C° | | | Min Required Electrical Power: | 0.5 | kW | Volume (l) |
| 2. MgH2+H2O->MgO+2*H2+E2 | 18% | MgO | Solid MgO | | | Electrical & Mechanical Power: | 1.50 | kW | Weight (kg) 64.42 47.18 |
| 26 + 18 -> 40 + 4 | | | if T>400C° | | | Useful Energy per Stored Materials: | | | |
| 3. 2*H2+O2->2*H2O+E3 | 31% | 2*H2O | Steam | | | | Weight | 2.43 MJ/kg | 0.67 kW-h/kg |
| 4 + 32 -> 36 (FC Energy+Steam) | | | 200 C° | | | | Volume | 2.98 MJ/liter | 0.83 kW-h/l |
| 4. C25H52+38*O2->25*CO2+26*H2O+E4 | 22% | CO2&H2O | CO2 Reacts | | | Useful Energy per System: *) | | | |
| 352 + 1216 -> 1100 + 468 | | | with Mg(OH)2 | | | | Weight | 1.68 MJ/kg | 0.47 kW-h/kg |
| 5. C25H52+25H2O->25CO+51H2 | Combined | 25CO2& | Energy Balance | | | | Volume | 2.29 MJ/liter | 0.64 kW-h/l |
| 352 + 450 -> 700 + 102 | 586: | 76H2 | -6.4 MJ/kg Par | | | *) Estimated for Structures/BOP is 30% of Weight and 30% of Volume to Fuel (B1112) | | | |
| 6. 25CO+25H2O->25CO2+25H2 | | | | | | **) Turbine Power is converted into electrical energy to provide Minimum System | | | |
| 7. CO2+Mg(OH)2->MgCO3+H2O | Exothermic | MgCO3 | Suspended in | | | Electrical Power Requirement. | Overall Turbine efficiency: | | 70% |
| 44 + 58 -> 84 + 13 | Waste Heat | | Water Tank | | | | | | |

Baseline 1: Li-Ion Batteries

Total Energy 108,000 kJ    30 kW-h

Li-Ion Battery System Weight (kg)    Volume (l)

176.47    115.38

(.17kW-h/kg)    (.26kW-h/l)

Baseline Unit's Electric Power: 1.50 kW
Power System Operational Time: 20.00 hours Useful Energy per System

| | Weight | 0.61 MJ/kg | 0.17 kW-h/kg |
|---|---|---|---|
| | Volume | 0.94 MJ/liter | 0.26 kW-h/liter |

Baseline 2: Liquid Hydrogen/Liquid Oxygen/PEM FC Power Unit

LH2/LO2 System: Weight    Volume    Density
kilogram    liters    kg/liter

| | | | | |
|---|---|---|---|---|
| Liquid Oxygen | 14.40 | 12.63 | 1.14 | |
| Liquid Hydrogen | 1.80 | 25.71 | 0.07 | |
| Total Stored Fuel: | 16.20 | 38.35 | | |

Baseline Unit's Electric Power    1.50 kWt
PEM FC Efficiency    50%
FC Energy    108,000 kj Useful Energy per Stored Materials (Oxygen and Hydrogen)

| | Weight | 6.67 MJ/kg | 1.85 kW-h/kg |
|---|---|---|---|
| | Volume | 2.82 MJ/liter | 0.78 kW-h/liter |

FIG. 10

| Item | 100% H2O2 | 100% MgH2 | Units | Total | | System Energy Efficiency: | | 54% |
|---|---|---|---|---|---|---|---|---|
| Propellant Weight | 16.76 | 2.91 | kg | 34.63 | H2 Total Energy | 120000 kJ/kg H2 | Paraffin Combustion Energy: | 30000 kJ/kg Par |
| Volume | 11.97 | 2.01 | liters | 28.25 | Energy Item | Value | Units | |
| Heat of Decomposition | 3000.00 | 10601.00 | kJ/kg | | SOFC Efficiency | 50% | Unitless | CO Combustion Energy: 10000 kJ/kg Par |
| Components Density | 1.22 | 1.27 | kg/liter (avg) | 1.23 | Thermal Energy Loss | 10% | Unitless | |
| Steam Heat Capacity | 2.10 | kJ/(kg *C*) | Concentrations: | | Total Energy | 199,437 kJ | | 2.77 kW |
| MgH2 Heat Capacity | 1.54 | kJ/(kg *C*) | H2O2 (w%) | 55% | Total Useful Therm Energy (TE) | 69,086 kJ | | 0.96 kW |
| H2O2 Heat of Evaporation | 1945.00 | kJ/kg | MgH2 (w%) | 70% | Total TE Dissipated | 91,437 kJ | | 1.27 kW |
| | | | | | Turbine Efficiency **) | 71% | Unitless | El Generator: 70% |
| Total H2 Generated | 0.99 | kg | | | *Resulting System Performance Data:* | | | |
| Total O2 Generated | 7.89 | kg | 1.3:Plant/Fuel W-Ratio | | Electrical & Mech TE Converted: | 48,843 kJ | | 0.68 kW |
| Total CO2 Generated | 3.90 | kg | 1.3:Plant/Fuel V-Ratio | | FC Electrical Energy: | 59,157 kJ | | 0.82 kW |
| | | | Extra H2O2(D) for Paraffin Ox | 0.00 | | | | |
| Total H2O Produced | 27.85 | kg | (kg): | | 100% H2O2 Rate: | 0.23 | :Gram/sec: | 0.42 H2O2 Solution |
| MgO Produced | 4.48 | kg | Mg(OH)2 for CO2 Sequester | | 100% MgH2 Rate: | 0.04 | :Gram/sec: | 0.06 MgH2 Slurry |
| MgCO3 Produced | 7.44 | kg | (kg): | 5.14 | Fuel Storage Length (cm): | 46.10 | 20" Diameter: | 13.95 |
| *Power Unit Operational Time (Hours)* | 20.00 | | *Reforming Index* | 0 | Fuel Storage Length (Inch): | 18.15 | | 5.49 |
| *Stoichiometric Basic Chemical Processes* | Energy% | By-Product | Comment | | Total (Inch): | 23.60 | | 1.65 |
| 1. 2*H2O2->2*H2O+O2+E1 | 25% | H2O | Water 200 C° | | Structures/BOP (30% from the Fuel Volume): | 5.45 | | 7.14 |
| 68 -> 36 + 32 | | | | | Min Required Electrical Power: | 0.5 | kW | Weight (kg): Volume (l) |
| 2. MgH2+H2O->MgO+2*H2+E2 | 15% | MgO | Solid MgO if T>400C° | | Electrical & Mechanical Power: | 1.50 | kW | 50.16 36.73 |
| 26 + 18 -> 40 + 4 | | | | | Useful Energy per Stored Materials: | | | |
| 3. 2*H2+O2->2*H2O+E3 | 59% | 2*H2O | Steam 200 C° | | Weight | 3.12 MJ/kg | | 0.87 kW-h/kg |
| 4 + 32 -> 36 (FC Energy+Steam) | | | | | Volume | 3.82 MJ/liter | | 1.06 kW-h/l |
| 4. C25H52+38*O2->25*CO2+26*H2O+E4 | 0% | CO2&H2O | CO2 Reacts with Mg(OH)2 | | Useful Energy per System: *) | | | |
| 352 + 1216 ->1100 + 468 | Combined | 25CO2& | Energy Balance | | Weight | 2.15 MJ/kg | | 0.60 kW-h/kg |
| 5. C25H52+25H2O->25CO+51H2 | 586: | 76H2 | -6.4 MJ/kg Par | | Volume | 2.94 MJ/liter | | 0.82 kW-h/l |
| 6. 25CO+25H2O->25CO2+25H2 | | | | | *) Estimated for Structures/BOP is 30% of Weight and 30% of Volume to Fuel (B1112) | | | |
| 7. CO2+Mg(OH)2->MgCO3+H2O | Exothermic | MgCO3 | Suspended in | | **) Turbine Power is converted into electrical energy to provide Minimum System | | | |
| 44 + 58 -> 84 + 13 | | Waste Heat | Water Tank | | Electrical Power Requirement. | | Overall Turbine efficiency: | 71% |

Baseline 1: Li-Ion Batteries

| | | | | |
|---|---|---|---|---|
| Total Energy | 108,000 kJ | | 30 kW-h | Baseline Unit's Electric Power: 1.50 kWt |
| Li-Ion Battery System Weight (kg) | Volume (l) | | | Power System Operational Time: 20.00 hours |
| 176.47 | 115.38 | | | Useful Energy per System |
| (.17kW-h/kg) | (.26kW-h/l) | | | Weight 0.61 MJ/kg 0.17 kW-h/kg |
| | | | | Volume 0.94 MJ/liter 0.26 kW-h/liter |

Baseline 2: Liquid Hydrogen/Liquid Oxygen/PEM FC Power Unit

| LH2/LO2 System: | Weight kilogram | Volume liters | Density kg/liter | |
|---|---|---|---|---|
| | | | | Baseline Unit's Electric Power 1.50 kWt |
| | | | | PEM FC Efficiency 50% |
| Liquid Oxygen | 14.40 | 12.63 | 1.14 | FC Energy 108,000 kj |
| Liquid Hydrogen | 1.80 | 25.71 | 0.07 | Useful Energy per Stored Materials (Oxygen and Hydrogen) |
| Total Stored Fuel: | 16.20 | 38.35 | | Weight 6.67 MJ/kg 1.85 kW-h/kg |
| | | | | Volume 2.82 MJ/liter 0.78 kW-h/liter |

METHODS AND SYSTEMS OF PRODUCING HYDROGEN AND OXYGEN FOR POWER GENERATION, AND POWER SOURCE

CROSS-REFERENCE TO RELATED APPLICATION

This application claims the benefit of U.S. Provisional Patent Application Ser. No. 61/092,358, filed Aug. 27, 2008, for "Methods and Systems of Producing Hydrogen and Oxygen for Power Generation, and Power Source," the entire disclosure of which is hereby incorporated herein by this reference.

TECHNICAL FIELD

Embodiments of the invention generally relate to methods and systems for producing hydrogen and oxygen and, more specifically to a fuel system designed for use with a solid oxide fuel cell.

BACKGROUND

The most common power source for non-air breathing engines or motors such as those in unmanned undersea vehicles (UUVs), satellites, lunar bases, and unmanned aerial vehicles (UAVs), are conventional batteries. However, conventional batteries have a low energy density and, thus, lack sufficient energy capacity for many desirable applications. The few types that may provide sufficient energy capacity, such as lithium thionyl chloride, are cost prohibitive.

The solid oxide fuel cell (SOFC) has been explored as a potential power source to increase endurance of electrical power systems in non-air breathing applications, which may assist in extended missions required of UUVs. A solid oxide fuel cell system utilizing hydrogen may be compact and lightweight, and have no major moving parts. Moreover, readily available catalyst materials such as platinum group metal or alloy may be used in the solid oxide fuel cell. Since SOFCs do not involve combustion, in ideal conditions they may be used to generate electricity with much higher reliability than conventional batteries. This is because they are simple, highly efficient, tolerant to impurities, and can at least partially reform hydrocarbon fuels internally.

To achieve even greater efficiency, medium sized and larger solid oxide fuel cells have been combined with gas turbines. The solid oxide fuel cells may be pressurized and the gas turbine produces electricity from the extra waste thermal energy produced by the fuel cell.

However, compressed and/or cryogenic hydrogen and oxygen are often required to feed a solid oxide fuel cell, resulting in excessively heavy containment and/or complex and heavy apparatus for obtaining and insulating cryogenic temperatures.

In view of the above, there is a need in the art for methods and systems for producing hydrogen and oxygen for power generation using solid oxide fuel cells.

BRIEF SUMMARY OF THE INVENTION

One embodiment of the present invention includes methods for producing power. Such methods may include reacting a metal hydride with water in a hydride reactor to produce heat, a metal oxide, and hydrogen, decomposing hydrogen peroxide in a peroxide reactor to produce high temperature water and oxygen and converting the hydrogen and the oxygen in at least one solid oxide fuel cell to produce water and electricity.

Another embodiment of the present invention includes a power generation system including a hydride reactor, a peroxide reactor and at least one solid oxide fuel cell. The hydride reactor may be configured to react a metal hydride with water to produce a metal oxide and hydrogen. The peroxide reactor may be configured to decompose hydrogen peroxide producing high temperature water and oxygen. The at least one solid oxide fuel cell may be positioned in a pathway of the hydrogen and the oxygen and configured to produce water and electricity by reacting the hydrogen and oxygen.

In yet another embodiment, the present invention includes methods of generating hydrogen and oxygen. Such methods may include decomposing hydrogen peroxide in a peroxide reactor to produce high temperature water and oxygen, separating the high temperature water from the oxygen and reacting a metal hydride with at least a portion of the high temperature water in a hydride reactor to produce heat, a metal oxide, and hydrogen.

A further embodiment of the invention includes a system for generating hydrogen and oxygen comprising. The system may include a peroxide reactor, a separating device and a hydride reactor. The peroxide reactor may be configured to decompose hydrogen peroxide to produce high temperature water or steam and oxygen. The separating device may be configured to separate the high temperature water from the oxygen. The hydride reactor may be configured to receive the high temperature water produced by the peroxide reactor and configured to react a metal hydride with the high temperature water to produce a metal oxide and hydrogen.

BRIEF DESCRIPTION OF THE DRAWINGS

While the specification concludes with claims particularly pointing out and distinctly claiming that which is regarded as embodiments of the present invention, the advantages of this invention may be more readily ascertained from the following description of the invention when read in conjunction with the accompanying drawings in which:

FIGS. 7-12 are tables summarizing data generated by running embodiments of a power generation system using a combined hydrogen/oxygen supply system under various conditions and with various reagents.

DETAILED DESCRIPTION OF THE INVENTION

Figure 1A:
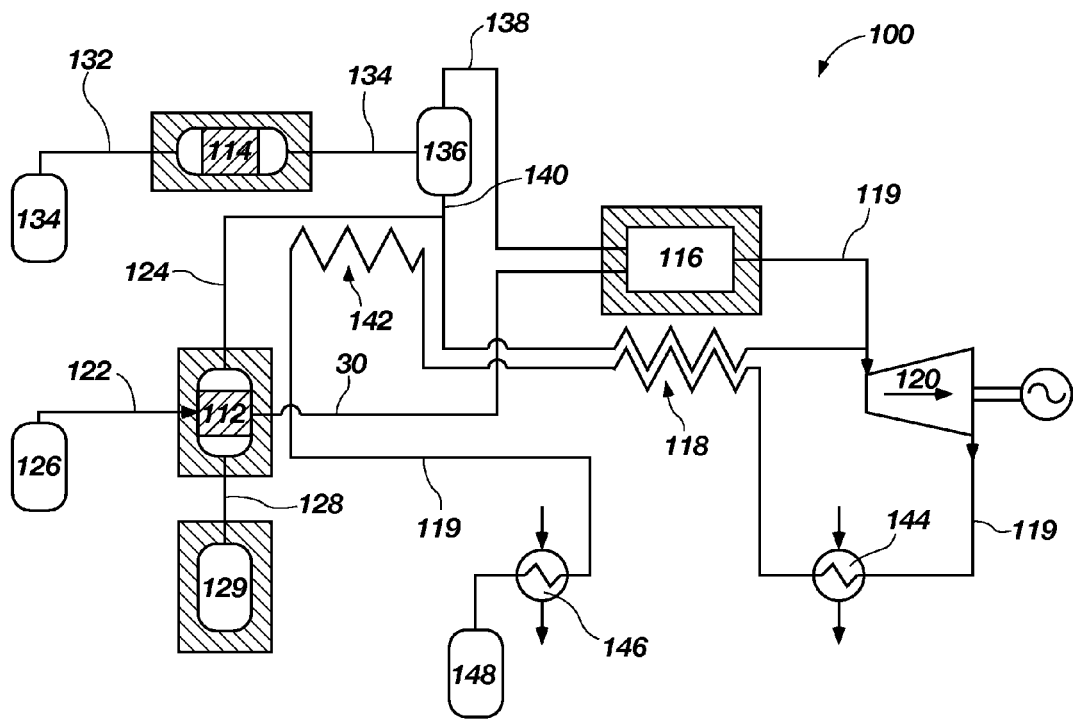
FIGS. 1-5 are simplified schematic diagrams illustrating embodiments of a power generation system using a combined hydrogen/oxygen supply system.

A method of generating hydrogen and oxygen is provided. The combined hydrogen and oxygen supply system uses hydrogen peroxide ($H_2O_2$) to produce oxygen ($O_2$), and water ($H_2O$) and magnesium hydride ($MgH_2$) to generate pure hydrogen ($H_2$). Using hydrogen peroxide and magnesium hydride allows for a highly energy-dense system at modest temperatures and pressures compared to a baseline hydrogen/oxygen system, which involves either high pressure or cryogenic systems. The decomposition of hydrogen peroxide to oxygen and water, and the reaction of magnesium hydride and water to a metal oxide such as, for example, magnesium oxide (MgO) and hydrogen are highly exothermic and may be utilized as an additional source of energy for thermal electric power, which ultimately may be used to increases the overall efficiency of a power unit. Resulting materials are water and magnesium oxide which may be converted back to magnesium hydride with an available stationary energy source. Water may be collected and may be used as an additional source of hydrogen and oxygen if needed.

A power generation system that includes hydrogen- and oxygen-producing components is also provided. As a non-limiting example, the hydrogen may be stored as a high density metal hydride and the oxygen may be obtained from the catalytic decomposition of hydrogen peroxide. In some embodiments, the metal hydride may be reacted as a slurry within a hydrocarbon. The heat produced by the exothermic decomposition of hydrogen peroxide may be used to preheat the reactants entering the hydride reactor. The oxygen produced by peroxide decomposition and the hydrogen from the hydride reactor may then be used to operate a solid oxide fuel cell. The reaction products in the solid oxide fuel cell include high-pressure steam with carbon dioxide ($CO_2$), resulting from oxidation of hydrocarbons that may be present in the metal hydride slurry. The reaction products may pass to a steam turbine, which may be used to extract additional work from this system. The reaction products may then be passed through a condenser where the water and carbon dioxide are recovered in a tank containing metal hydride which is capable of reacting with carbon dioxide to form a storable metal carbonate.

Electrical and mechanical power generation may be provided from a system that is entirely self-contained; that is, the system generates its own fuel and oxidizer for use in a solid oxide fuel cell (SOFC) from safe constituents stored within the system. The hydrogen fuel is derived from a metal hydride slurry that reacts with water in either the liquid or vapor (steam) phase. The metal hydrides include magnesium hydride, lithium hydride and aluminum hydride. The hydride carrier may be a liquid hydrocarbon, such as mineral oil, and the hydride powder is kept in suspension by the use of a dispersant. Although a less desirable alternative, due to the necessity for a stirring apparatus to reduce/eliminate particle clumping and clogging, hydride powder can be used in place of the slurry. Oxygen may be derived from the catalytic decomposition of hydrogen peroxide, which reaction also produces the water required for the hydride-to-hydrogen reaction. Thus, no external constituents, such as air, are required, rendering this system particularly suited to non-air breathing applications such as unmanned undersea vehicles, satellite power, lunar base power, unmanned aerial vehicles, and other subterranean and extraterrestrial applications.

The power generation system may be configured to have a significantly higher energy density and/or power output in comparison to systems employing electro-chemical batteries or compressed oxygen/cryogenic hydrogen storage systems. The use of easily transportable magnesium hydride slurry obviates the need for a complex particle stirring apparatus and eliminates the danger of particle clumping and clogging. The use of a high-temperature solid oxide fuel cell permits the addition of topping and/or bottoming cycles to increase power output and increase energy density. Solid oxide fuel cells also eliminate the need for significant heat rejection to the surroundings as required when proton exchange membrane (PEM) fuel cells are used.

The slurry hydrocarbon carrier introduces a potential for increasing the energy density of the system by using a hydrocarbon to fuel an additional power cycle. Further increases in energy density are achievable by reacting carbon dioxide (resulting from using the hydrocarbon carrier in a power cycle) with metal particles. This invention will result in power generation solutions An example embodiment of a power generation system 100 of the present invention is shown in the simplified schematic diagram illustrated in FIG. 1A. The power generation system 100 includes a hydride reactor 112, a peroxide reactor 114, one or more solid oxide fuel cells 116 and optionally, a heat exchange device 118 and a turbine-generator 120, as described in further detail hereinbelow. The power generation system 100 may comprise any type of hydride reactor such as, for example, a gas cell, a gas discharge cell, or a microwave reactor, or any other type of device capable of converting a metal hydride to a metal oxide and hydrogen.

The hydride reactor 112 of the power generation system 100 may be configured to receive and react a metal hydride 122 and water stream 124 to form a metal oxide 128 and hydrogen 130. The hydride reactor 112 may convert the metal hydride 122 and water stream 124 according to Reactions 1a and 1b, wherein M is a metal:

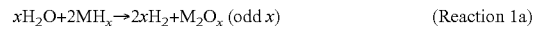

$$xH_2O+2MH_x \rightarrow 2xH_2+M_2O_x \text{ (odd } x\text{)} \qquad \text{(Reaction 1a)}$$

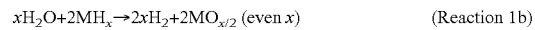

$$xH_2O+2MH_x \rightarrow 2xH_2+2MO_{x/2} \text{ (even } x\text{)} \qquad \text{(Reaction 1b)}$$

The metal hydride 122 may be stored, for example, using a metal hydride supply tank 122, which is configured to supply the hydride reactor 112. The water stream 124 may be supplied to the hydride reactor 112 as high temperature water or steam, as will be described in detail herein. The metal hydride 122 may be provided to the hydride reactor 112 as a powder or as a slurry including a mixture of from about 20% to about 85% metal hydride 122 and a hydrocarbon, such as, for example, mineral oil or a paraffin. By way of non-limiting example, the metal hydride 122 may include at least one of magnesium hydride, lithium hydride and aluminum hydride. Optionally, the hydride reactor 116 may be cooled by directing excess cooled water to the reaction chamber, as will be described in detail herein.

As a non-limiting example, the metal hydride 122 may be 70% milled magnesium hydride slurry, the viscosity of which may be predetermined based on the configuration of the power generation system 100. If the metal hydride is magnesium hydride ($MgH_2$), the reaction with water may produce about 283.3 kJ/gmol magnesium oxide. Metal oxide (MO) material produced as a byproduct of the reaction may be stored in a recovery tank 129. Thermal reactions from the conversion of the metal hydride and the decomposition of hydrogen peroxide create electrical power. Byproducts of these reactions are recyclable or environmentally safe to landfill. A paraffin reformer (not shown) may optionally be included in the system 100 and may be used, for example, to convert hydrocarbons present in the metal hydride slurry to hydrogen and carbon dioxide, as described in further detail below.

The peroxide reactor 114 may be any suitable apparatus or device known in the art for decomposing hydrogen peroxide such as, for example, a hydrogen peroxide decomposition reactor that is available from GNIICHTEOS (Moscow, Russia). Hydrogen peroxide may be utilized to produce high density oxygen as well as for water storage. The peroxide reactor 114 may be configured to receive and decompose hydrogen peroxide ($H_2O_2$) 132 to form a product stream 134 including water and oxygen. By way of non-limiting example, the hydrogen peroxide may include 40% by weight to 100% by weight hydrogen peroxide and 0% by weight to 60% by weight water, and more specifically, may include 55% hydrogen peroxide and 45% water. The hydride reactor 112 may convert the metal hydride 122 and water stream 124 according to Reaction 2:

$$H_2O_2 \rightarrow H_2O + \tfrac{1}{2}O_2 \quad \text{(Reaction 2)}$$

The hydrogen peroxide 132 may be stored and supplied to the peroxide reactor 114 via a peroxide supply tank 134. An apparatus, such as separator 136, may be used to separate oxygen 138 and water 140 produced by the peroxide reactor 114. Since the overall decomposition reaction of hydrogen peroxide (Reaction 2) is an exothermic reaction that produces about 105.7 kJ/gmol of hydrogen peroxide, high temperature water 140 and high temperature oxygen 138 may be produced. In some embodiments, the high temperature water 140 may be supplied from the separator 136 to the hydride reactor 112 to increase the efficiency of the reaction of the water with the hydride, which may result in increased hydrogen production. Thus, the high temperature water 140 may be used to self-regulate the production of hydride reactor by controlling the amount of high temperature water or steam 140 supplied thereto. Additionally, a portion of the high temperature water 140 may be used as a heat source for the solid oxide fuel cells 116, which may be facilitated by heat exchange device 118. By way of non-limiting example, the solid oxide fuel cells 116 may be cooled using a conventional jacket.

The oxygen 138 produced by the hydride reactor 114 and the hydrogen 130 produced by the hydride reactor 112 may be introduced to a solid oxide fuel cell 116, which reacts the oxygen 138 and hydrogen 130 to produce water and electrical energy according to Reaction 3:

$$2H_2 + O_2 \rightarrow 2H_2O + \text{electricity} \quad \text{(Reaction 3)}$$

The solid oxide fuel cells 116 may be operated at pressures of less than about twenty (20) atm. Each of the solid oxide fuel cells 116 may have a power density in a range extending from about one (1) kW to about three (3) kW. Each of the solid oxide fuel cells 116 may have a cell density of 0.60 W/cm² and may have an operating efficiency of 50-55%. As a non-limiting example, the solid oxide fuel cells 16 may be arranged in a stack having lateral dimensions of from about 14.5 cm to about 22.2 cm, a thickness of about 8.3 cm, so that the stack has a volume of about 2.0 liters and a weight of about 5.0 kg. The solid oxide fuel cells 116 may be used to generate a direct electric current (DC). The high temperature water 140 produced during the metal hydride reaction may be used as a heat source for the solid oxide fuel cells 116 by transferring the heat using, for example, a heat exchange device 118.

Thermal energy in the form of steam may exit as exhaust stream 119, which is produced by reacting hydrogen and oxygen using the solid oxide fuel cells 116, may be directed and utilized as a power source for an engine, such as turbine-generator 120, may be used to produce additional electrical energy in the form of an alternating electric current (AC) that may be provided to the solid oxide fuel cells 116. In some embodiments, the turbine-generator 120 may include a regenerative heat engine, such as a Stirling engine. Higher temperature steam in the exhaust stream increases the efficiency of the turbine-generator 120. Sequential use of the solid oxide fuel cells 116 and the turbine-generator 120 increases the energy of the steam via the hydrogen and oxygen reaction in the solid oxide fuel cell and in parallel converts about fifty (50) percent of this chemical energy into electrical energy.

After being used to power the turbine-generator 120, the waste heat in exhaust stream 119 may be cooled using a condenser 144. By way of non-limiting example, the condenser 144 may be supplied with water having a decreased temperature, such as sea water. Additionally, the waste heat in the exhaust stream 119 may be recirculated to facilitate the reaction performed by the solid oxide fuel cells 116 or the hydride reactor 112 using, for example, heat exchange devices 118 and 142, or any other conventional heat transfer device or process. After harnessing the thermal energy from the system 100 as exhaust stream 119, the exhaust stream 119 may be passed through and cooled using, for example, a conventional condenser 146 and may then be stored in recovery tank 148.

In some embodiments, additional electrical energy may be generated by reacting hydrocarbons present in the metal hydride slurry. For example, if a slurry including magnesium hydride and mineral oil is used, the hydride reactor may be run at temperatures greater than about seven hundred degrees Celsius (700° C.) and, more particularly in a range of from about in a range of from about seven hundred degrees Celsius (700° C.) to about eight hundred degrees Celsius (800° C.) to cause the mineral oil to react in the presence of hydrogen and steam to form methane and hydrogen. The methane and hydrogen produced by the hydride reactor during the reaction of mineral oil with water may be directed to and reacted at the solid oxide fuel cells to generate additional electrical energy.

In additional embodiments, hydrocarbons, such as mineral oil, may be separated from the hydrogen stream produced by the hydride reactor and may be reacted on a catalyst, such as platinum to produce additional hydrogen. For example, the hydrocarbons may be separated using a conventional steam reforming process and a water-gas shift reaction. By way of non-limiting example, if the hydrocarbon were decane, decane may be converted to carbon dioxide and hydrogen according to Reaction 4:

$$C_{10}H_{22} + 20H_2O \rightarrow 10CO_2 + 31H_2 \quad \text{(Reaction 4)}$$

In such an embodiment, the reaction of decane with water may produce about 1202.7 kJ/gmol decane. Alternatively, the hydrocarbon in the metal hydride slurry may be separated, recovered and stored.

When used to obtain additional hydrogen, the overall reaction above indicates that carbon dioxide will be produced. For several of the applications projected for this invention (e.g., UUVs), the carbon dioxide may be sequestered or converted to substances that may be easily stored and later recycled or refused. As a non-limiting reaction, the carbon dioxide may be reacted with magnesium particles to produce magnesium oxide according to Reactions 5 and 6:

$$Mg + CO_2 \rightarrow MgO + CO \quad \text{(Reaction 5)}$$

$$Mg + CO \rightarrow MgO + C(s) \quad \text{(Reaction 6)}$$

As previously discussed, magnesium oxide storage will already have been made for the hydride-water reaction and the solid carbon is readily captured and stored. This approach requires that a quantity of magnesium powder be available on board. However, since these reactions are overall exothermic, the energy release can be used to further elevate the temperature of the water required for the hydride-water reaction to improve reactivity.

To illustrate the flexibility of the invention to accommodate the requirements of a variety of missions, representative configurations are presented below.

Figure 1B:
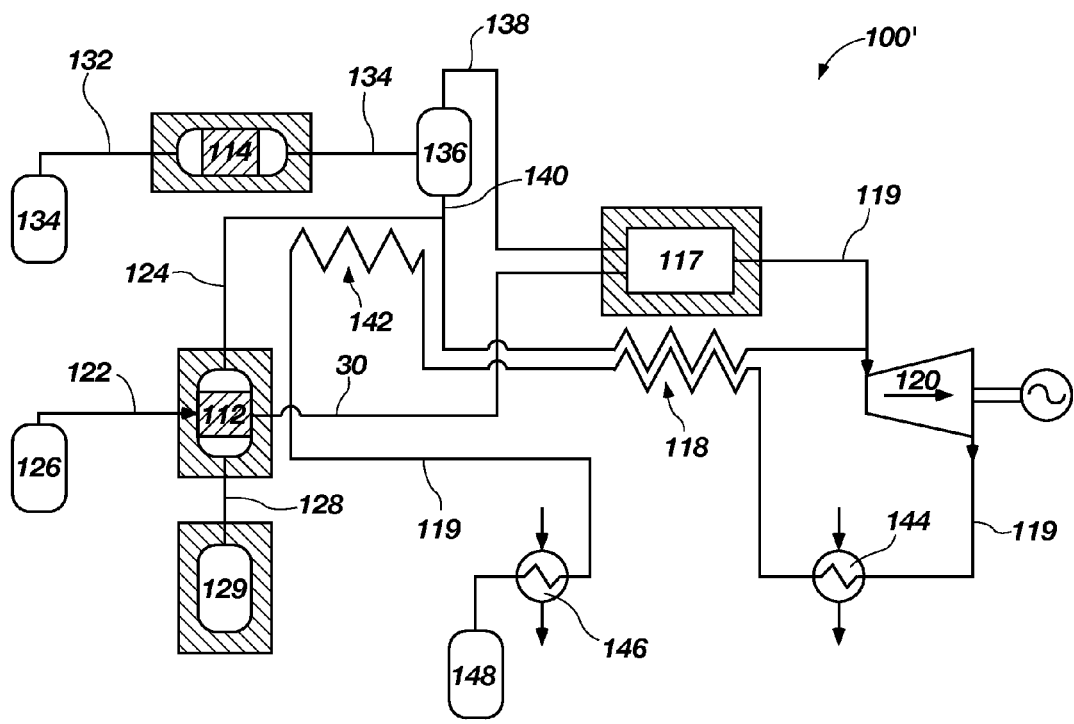

In FIG. 1B, another example embodiment of a power generation system 100' is shown that includes a hydride reactor 112, a peroxide reactor 114, a heat exchanger 118, a combustor 117, and a turbine generator 120. The system 100' may be configured as previously described with respect to FIG. 1A, however, the combustor 117 is used in place of the solid oxide fuel cells 116. Sufficient water was introduced to the system

100' to cool the combustion chamber so that the output was about 1300° C. The system 100' as shown may have an overall efficiency of about 30%. By running an ideal Brayton cycle (i.e., removing the condenser 144), an efficiency of about 44% may be obtained. Since the system 100' produces carbon dioxide, a sequestration process may be included such as, for example, reacting carbon dioxide with sodium hydroxide (NaOH). The sodium hydroxide may be placed in a water accepting tank and steam at a temperature of about 100° C. may be used to dissolve the sodium hydroxide so that it reacts with carbon dioxide to form sodium carbonate ($Na_2CO_3$). Extra steam may be returned to the system 100' to support the non-condensing cycle.

Figure 2:
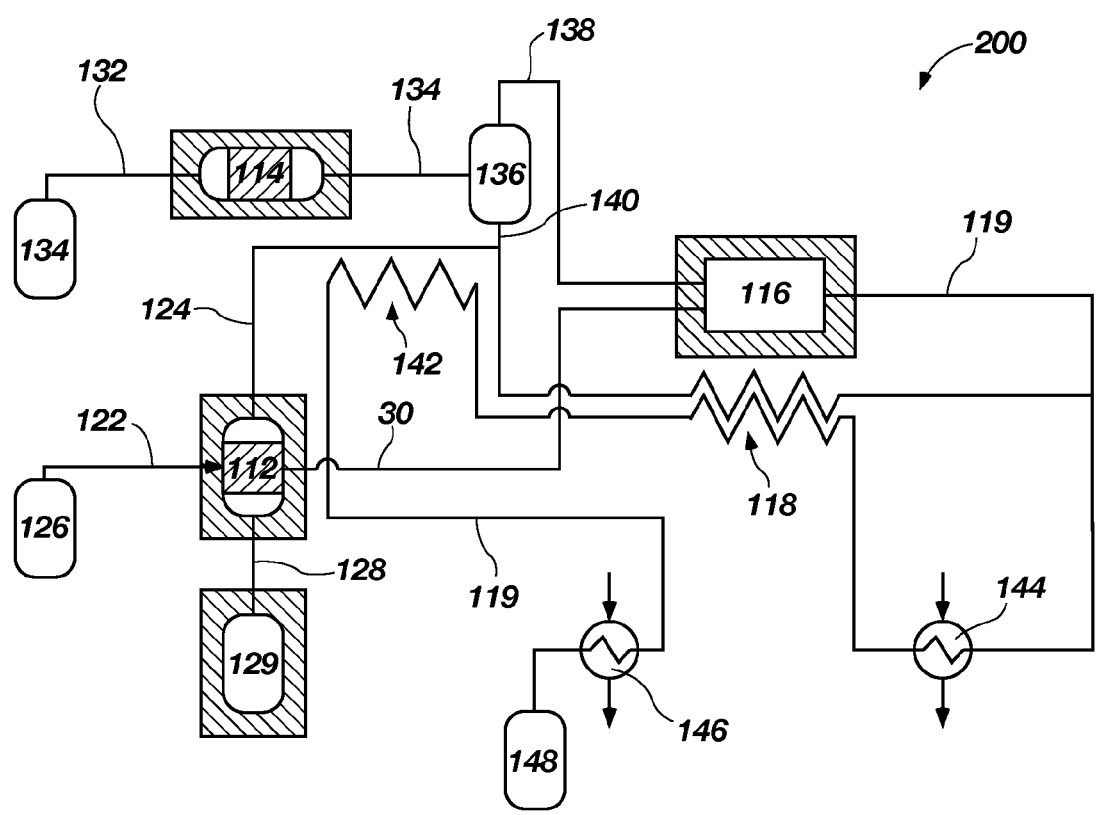

Another example embodiment of a power generation system 200 is shown in the simplified schematic diagram illustrated in FIG. 2. A hydride reactor 112, a peroxide reactor 114, a heat exchanger 118 and one or more solid oxide fuel cells 116 may be configured as previously described with respect to FIG. 1A. By way of non-limiting example, the solid oxide fuel cells 116 may be operated a pressure of greater than 1 atm. Heat stored in the exhaust stream 119, which is produced during the reaction of hydrogen and oxygen at the solid oxide fuel cells 116, may be recycled to the solid oxide fuel cells 116 using, for example, a heat exchange device 118. As a non-limiting example, the exhaust stream 119 may be passed through a condenser 144, and may then be directed to the heat exchange device 118. By directing heat from the exhaust stream 119 to the solid oxide fuel cells 116, thermal energy is utilized increasing the efficiency of the system 200. After using heat from exhaust stream 119 to facilitate processes within the system 200, such as the solid oxide fuel cells 116 and the hydride reactor 112, the exhaust stream 119 may be cooled using condenser 146 and stored in recovery tank 148. Carbon dioxide may be produced as a byproduct of the reaction of hydrocarbons in the metal hydride slurry with water and hydrogen and may be stored for later recycling or disposal. As a non-limiting example, the system 200 may be used in a submarine and the excess heat may be rejected to into ocean water.

Figure 3:
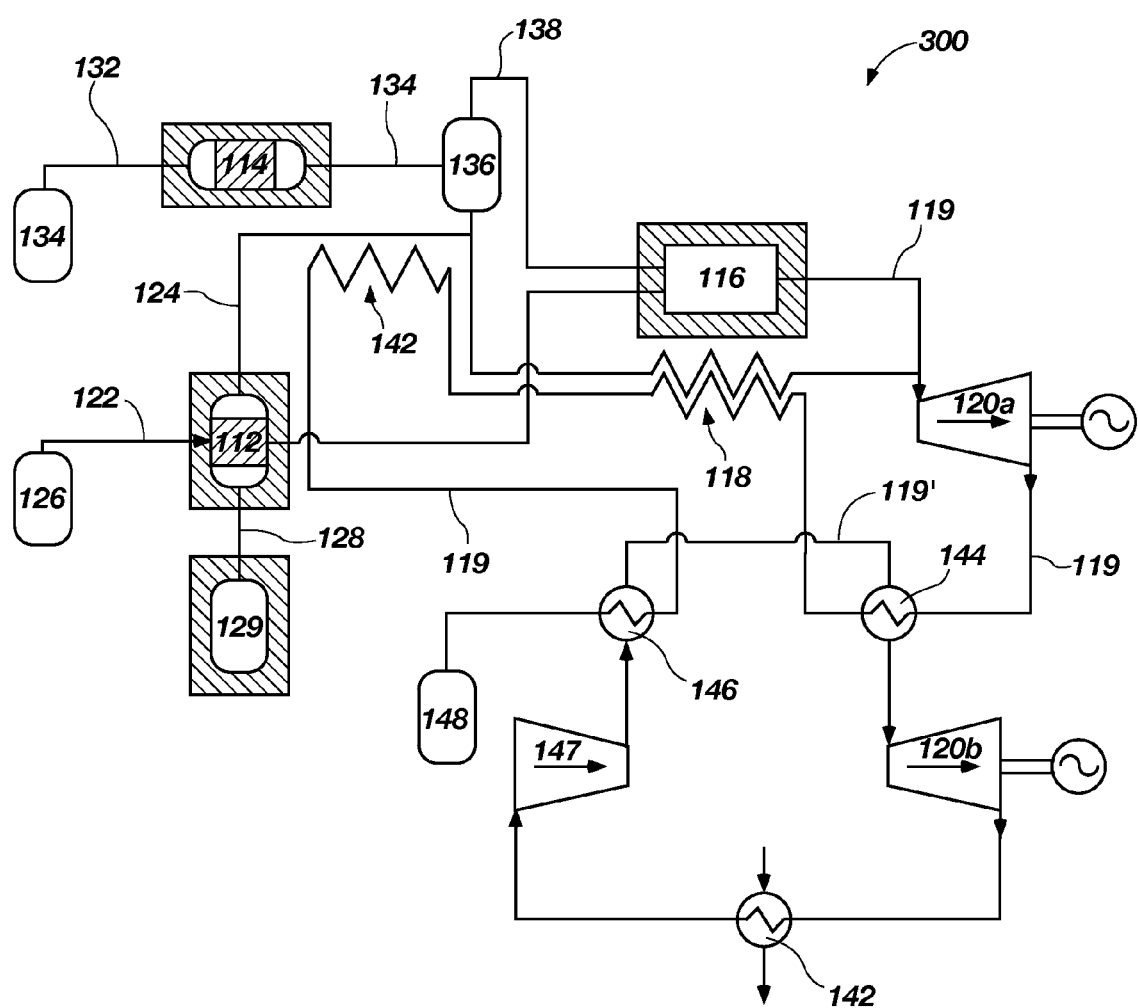

Referring to FIG. 3, a simplified schematic diagram illustrating another example embodiment of a power generation system 300 is shown. The system 300 may include a hydride reactor 112, a peroxide reactor 114, a heat exchanger 118, one or more solid oxide fuel cells 116, and a turbine-generator 120a configured as previously described with respect to FIG. 1A. For example, the solid oxide fuel cells 116 utilized in a system 400 may operate at high pressures (i.e., from about 3 atm to about 15 atm) or at low pressures (i.e., about 1 atm). The exhaust stream 119 produced by the solid oxide fuel cells 116 may be used as the input in a closed loop Brayton cycle having a pressure independent of the pressure used for the solid oxide fuel cells 116. After being used to power the turbine-generator 120a, as described with respect to FIG. 1A, the exhaust stream 119 may be directed to another turbine-generator 120b and, optionally, through a heat exchange device 142 before being passed through compressor 144. Thereafter, the exhaust stream 119 may be fed through condenser 146 and into recovery tank 148 for storage. Additionally, a portion 119' of the exhaust stream 119 may be directed through both the condenser 144 and the condenser 146 before being directed to the recovery tank 148. By way of non-limiting example, the system 400 may be cooled via a heat jacket, which cools the solid oxide fuel cells 116, and by directing cooled excess water to the hydride reactor 116. Carbon dioxide may be produced as a byproduct of the reaction of hydrocarbons in the metal hydride slurry with water and hydrogen and may be sequestered and stored.

Figure 4:
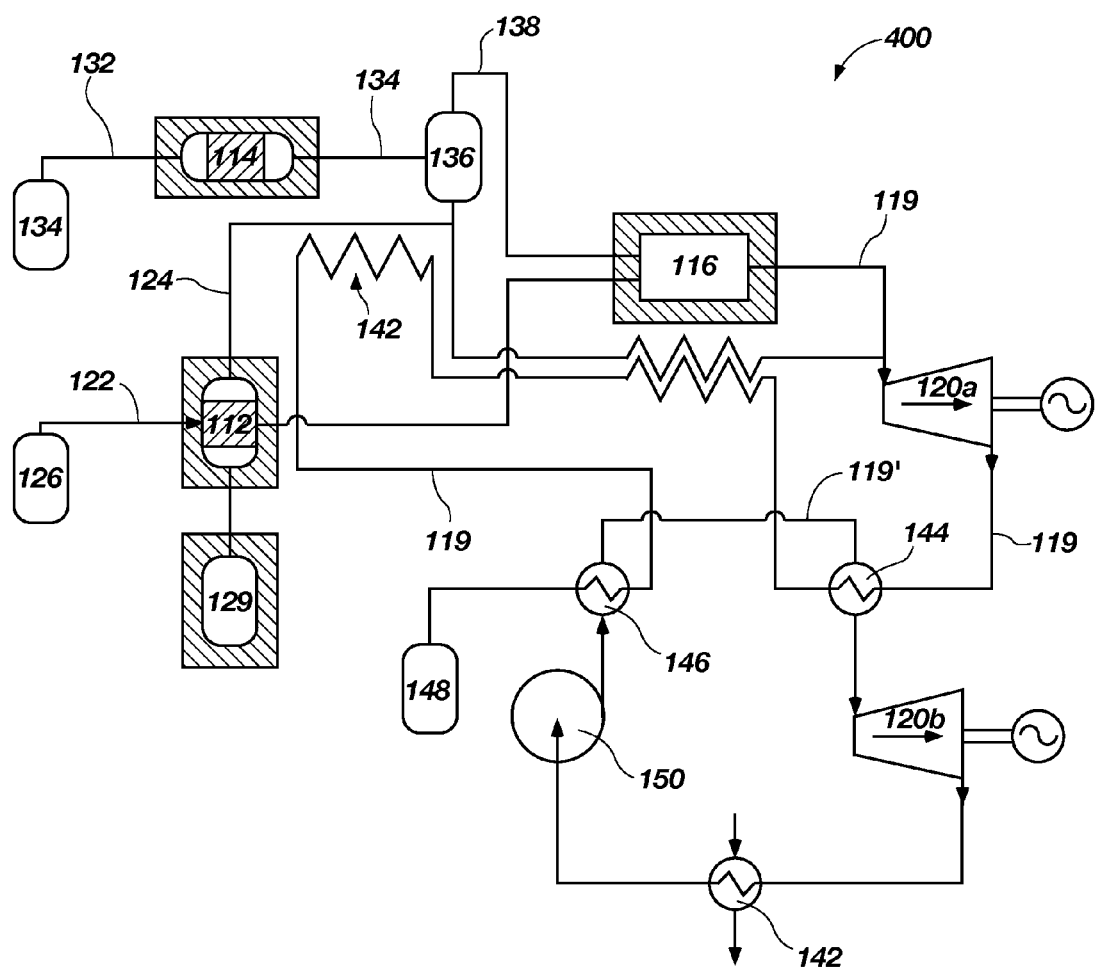

FIG. 4 is a simplified schematic diagram showing yet another example embodiment of a power generation system 400. The system 400 may include a hydride reactor 112, a peroxide reactor 114, a heat exchanger 118, one or more solid oxide fuel cells 116, and a turbine-generator 120a configured as previously described with respect to FIG. 1A. As a non-limiting example, the exhaust stream 119 produced by the solid oxide fuel cells 116 may be used as the input in a closed loop Rankine cycle having a pressure independent of the pressure used for the solid oxide fuel cells 116. As previously discussed, the solid oxide fuel cells 116 utilized in the system 400 may operated at high pressures or at low pressures. After being used to power the turbine-generator 120a, as described with respect to FIG. 1A, the exhaust stream 119 may be directed to another turbine-generator 120b by way of a condenser 144. The exhaust stream 119 may then be directed to a condenser 142 by way of a pump 150. Thereafter, the exhaust stream 119 may be fed through condenser 146 and into recovery tank 148 for storage. Additionally, a portion 119' of the exhaust stream 119 may be directed through both the condenser 144 and the condenser 146 before being directed to the recovery tank 148. By way of non-limiting example, the system 400 may be used in a submarine and the excess heat may be rejected into surrounding ocean water.

Figure 5:
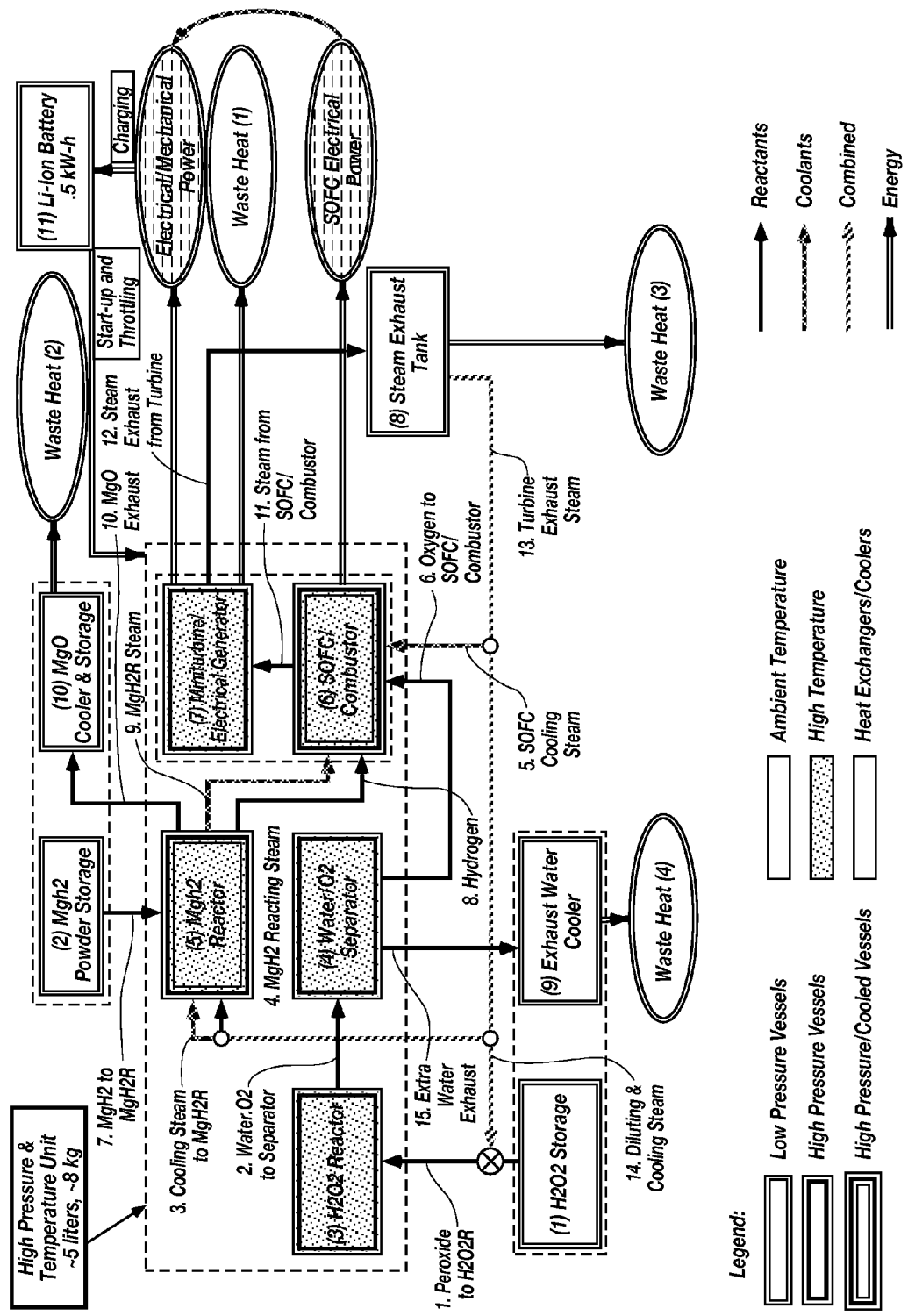

A power generation system 500 shown in the simplified schematic diagram illustrated in FIG. 5 summarizes the systems shown in FIGS. 1-4.

Figure 6:
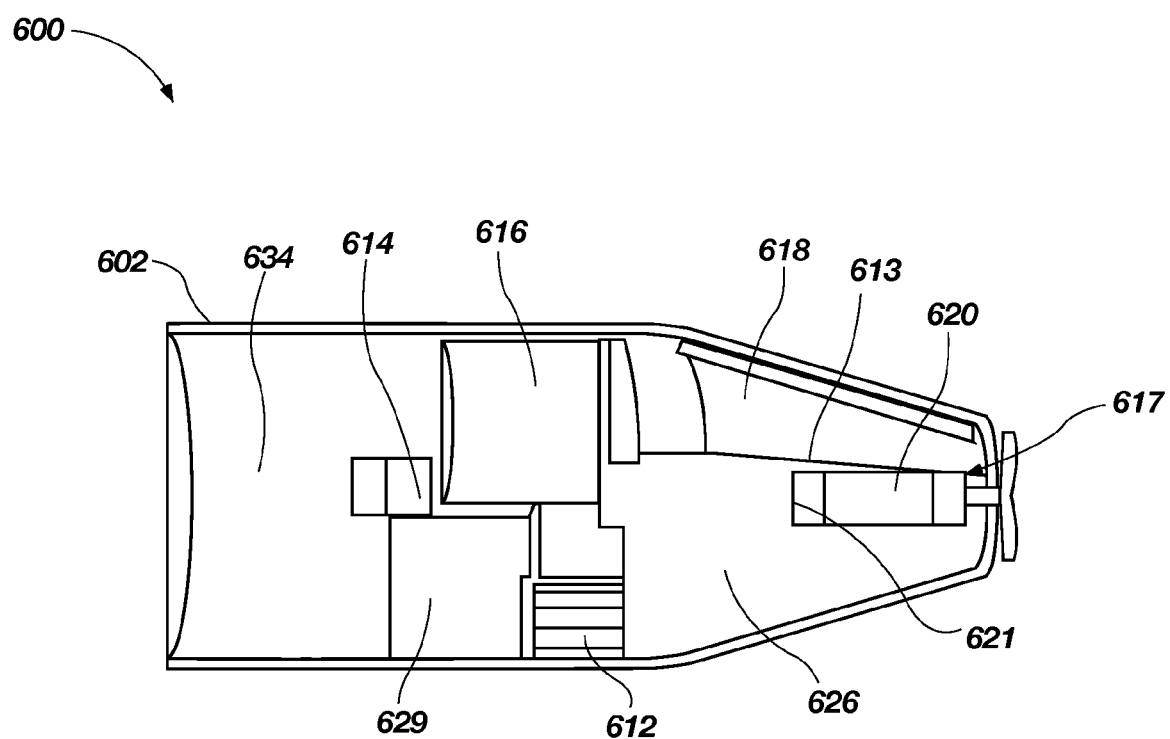
FIG. 6 is a simplified cross-sectional view of a layout of a combined hydrogen/oxygen supply system that may be used as an onboard mobile power system.

FIG. 6 is a simplified schematic diagram illustrating a layout of a combined hydrogen oxygen supply system 600 that includes solid oxide fuel cells 616, peroxide storage 634, a peroxide reactor 614, a heat exchanger 618, a turbine 620, a transmission 617, a generator 621, metal hydride storage 626, a hydride reactor 612, and metal oxide storage 629, each of which is arranged within an outer casing 602. The combined hydrogen oxygen supply system 600 may be used to produce energy as described with respect to FIG. 1A and FIGS. 2-7.

As would be recognized by one of skill in the art, the parameters and specifications of the power generation system may be configured for different applications as well as to satisfy particular mission requirements. The methods may be used to provide hydrogen and oxygen with a high volumetric energy density that may be used for extended periods of time, for example, up to 100 hours, and which may be used outside the atmosphere for feeding high-power fuel-cell units. The methods may further be utilized to supply water for a crew or other uses.

Exothermic hydrogen peroxide and magnesium hydride reactions for generating hydrogen and oxygen on-demand for vehicle fuel cells and supplying oxygen and useable water. These exothermic reactions may be utilized to provide about one-third (⅓) of the additional electric power for the system. The hydrogen and oxygen produced using the power generation system has an energy density of about twice that of conventionally used compressed hydrogen and oxygen. Moreover, the safety concerns associated with storing and using compressed hydrogen and oxygen are resolved. The system may also provide hydrogen and oxygen suitable for fuel cell use as well as breathable oxygen and drinkable water for crew, if needed.

The compact system with minimum moving parts for material exchange and supply with an energy density up to about 3 MJ/kg to about 6 MJ/kg of storage/generation system energy per unit of stored materials may be developed. By integrating the thermal energy produced in the system 100, the electrical energy produced by the turbine, and the heat exchanger-Stirling/turbine, conversion of thermal energy into electric power may be maximized or controlled as needed.

With higher than estimated efficiencies of thermal energy conversion and fuel cells, the system will be able to achieve even higher energy density parameters. During operation of the unit, waste streams released into the environment are minimal, if any (only water and thermal energy). With higher efficiency of the system, its thermal energy dissipation may be further reduced. The system should provide an efficient source of fuel for an out-of-atmosphere vehicle and oxygen and water for the crew, if needed. Fuel storage, reactors, heat exchangers, and energy converters can be designed in a compact, integrated way to optimize thermal management and energy conversion for minimum heat release to the environment and to maximize overall system efficiency. No exotic materials or subsystems are needed to demonstrate operability of this system. A very low fuel consumption rate (grams per minute) does not seem to create many challenges for thermal management and chemical process control.

The following example serves to illustrate embodiments of the present invention in more detail. This example is not to be construed as being exhaustive or exclusive as to the scope of this invention.

EXAMPLES

Example 1

Power Generation System Energy Efficiencies

The following provides non-limiting examples of systems having the ability to produce hydrogen and oxygen and utilize the hydrogen and oxygen in power generation. Modeling was conducted to estimate electrical power production and efficiency for the systems as set forth in FIGS. 7-12.

A summary of the usage and results of a power generation system such as that shown in FIG. 1A, without utilizing the solid oxide fuel cells, is shown in FIG. 7. When the power generation system is run with 100% magnesium hydride as the metal hydride 122 and 55% hydrogen peroxide 132, the system may produce about 1.5 kW total power and about 0.5 kW electrical power during a period of about 20 hours. The system efficiency may be about 42%.

FIG. 8 summarizes the usages and results of a power generation system such as that shown in FIG. 1A, without utilizing the solid oxide fuel cells. The power generation system may be run with a slurry including about 70% magnesium hydride and about 30% mineral oil as the metal hydride 122 and 55% hydrogen peroxide 132. The system may produce about 1.5 kW total power and about 0.5 kW electrical power during a period of about 20 hours. The overall system efficiency may be about 38%.

FIG. 9 provides a summary of the usages and results of a power generation system such as that shown in FIG. 1A, without utilizing the solid oxide fuel cells. The power generation system may be run using a slurry including about 70% magnesium hydride and about 30% mineral oil as the metal hydride 122 and 55% hydrogen peroxide 132. A paraffin reformer was included in the system as illustrated by the paraffin reforming index. The system may produce about 1.5 kW total power and about 0.5 kW electrical power during a period of about 20 hours. The overall system efficiency may be about 38%.

A summary of the usage and results of a power generation system such as that shown in FIG. 1A is provided in FIG. 10. Solid oxide fuel cells 116 may be run in the system and may have an efficiency of about 50%. The power generation system may be run with 70% magnesium hydride as the metal hydride 122 and 55% hydrogen peroxide 132. The system may produce about 1.5 kW total power and about 0.5 kW electrical power during a period of about 20 hours. The overall system efficiency may be about 42%.

FIG. 11 provides a summary of the usages and results of a power generation system such as that shown in FIG. 1A wherein the optional paraffin reformer may be included. Solid oxide fuel cells 116 may be run in the system and may have an efficiency of about 50%. The power generation system may be run with 70% magnesium hydride as the metal hydride 122 and 55% hydrogen peroxide 132. The system may produce about 1.5 kW total power and about 0.5 kW electrical power during a period of about 20 hours. The overall system efficiency may be about 42%.

Figure 12:
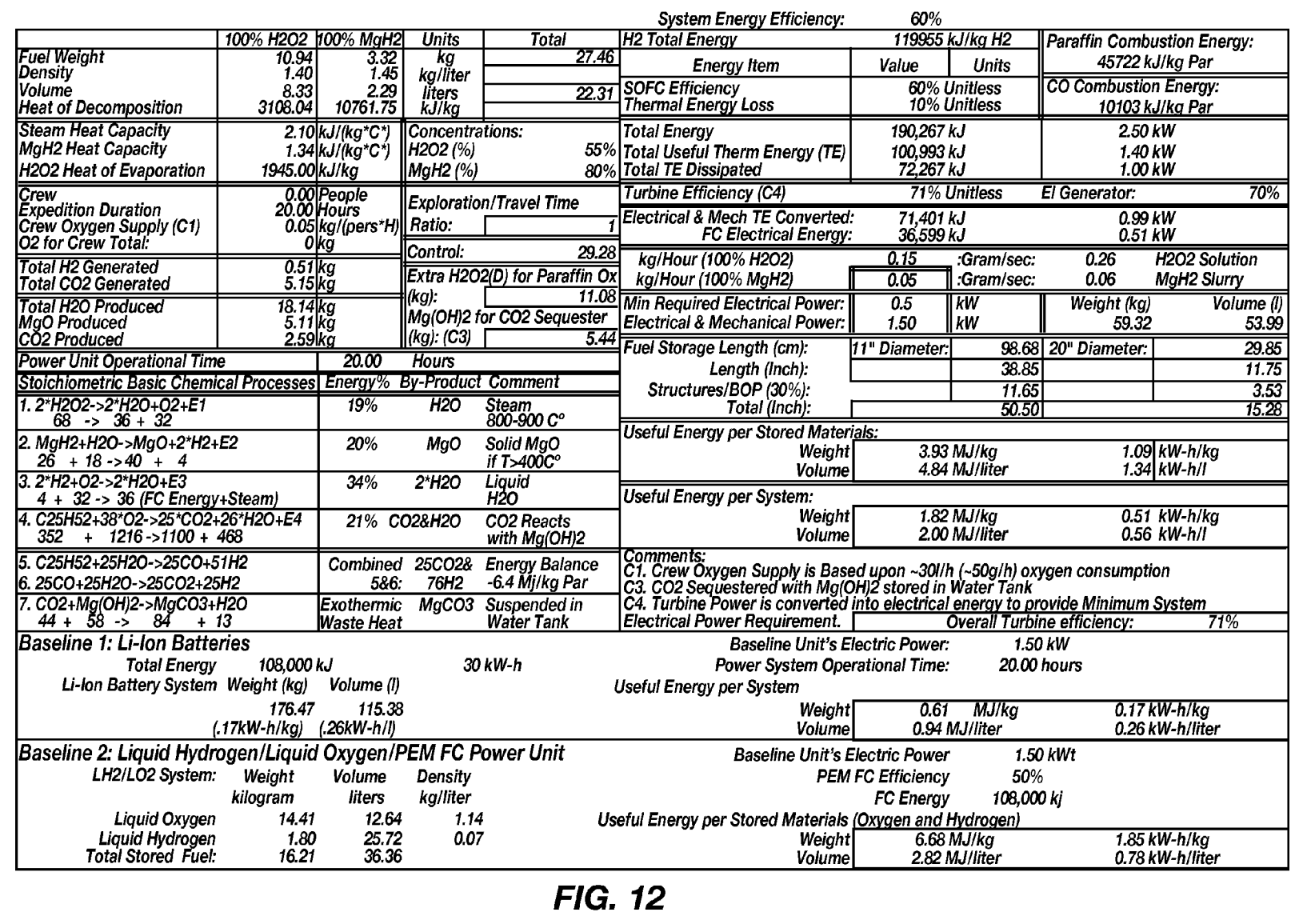

FIG. 12 provides a summary of the usages and results of a power generation system such as that shown in FIG. 1A wherein the optional paraffin reformer may be included. Solid oxide fuel cells 116 may run in the system and may have an efficiency of about 60%. The power generation system may be run with 80% magnesium hydride as the metal hydride 122 and 55% hydrogen peroxide 132. The system may produce about 1.5 kW total power and about 0.5 kW electrical power during a period of about 20 hours. The overall system efficiency may be about 60%.

As shown in FIGS. 7-12, utilizing solid oxide fuel cells and a paraffin reformer provided the highest overall system efficiency. Additionally, increased metal hydride content may provide an increased in overall system efficiency.

Example 2

Comparison of Power Generation System Cycling Efficiencies

A power generation system configured similarly to the system shown in FIG. 5 may be run using various metal hydride materials. High density hydrogen/oxygen production was performed by reacting the metal hydride and decomposing hydrogen peroxide as described with reference to FIG. 1A. For the sake of comparison, a proton exchange membrane fuel cell ("PEMFC") may be used in place of, or in addition to, the solid oxide fuel cells ("SOFC") shown in FIG. 5. Table 1 shows a comparison of the system efficiencies using one of magnesium hydride, lithium hydride and aluminum hydride in a power generation system that includes one of a SOFC or a PEMFC without hydrogen/oxygen production, a SOFC in combination with hydrogen/oxygen production, and a PEMFC with hydrogen/oxygen production.

TABLE 1

|  | Fuel Cell only (SOFC or PEMFC) Efficiency/SFC (lb/hp-hr) | SOFC with 40% Efficient Bottoming Cycle Efficiency/SFC (lb/hp-hr) | PEMFC with 15% Efficient Bottoming Cycle Efficiency/ SFC (lb/hp-hr) |
|---|---|---|---|
| Magnesium Hydride | 24%/5.31 | 53%/2.54 | 36%/3.75 |
| Lithium Hydride | 25%/4.86 | 53%/2.32 | 35%/3.37 |
| Aluminum Hydride | 24%/4.71 | 52%/2.16 | 35%/3.26 |

As shown in Table 1, utilizing the hydrogen/oxygen production described with reference to FIG. 1A in combination with a solid oxide fuel cell provides the highest energy efficiency (lb/hp-hr). Surprisingly, the solid oxide fuel cell in combination with hydrogen/oxygen production provides a higher energy efficiency than the proton exchange membrane fuel cell in combination with hydrogen/oxygen production.

Specific embodiments have been shown by way of example in the drawings and have been described in detail herein. The invention, however, may be susceptible to various modifications and alternative forms. It should be understood that the invention is not intended to be limited to the particular forms disclosed. Rather, the invention includes all modifications, equivalents, and alternatives falling within the spirit and scope of the invention as defined by the following appended claims.

What is claimed is:

1. A method for producing power, comprising:
reacting water with a slurry comprising a metal hydride and a hydrocarbon carrier in a hydride reactor to produce heat, a metal oxide, and hydrogen;
separating hydrocarbons exiting the hydride reactor;
reacting the hydrocarbons on a catalyst to produce further hydrogen, carbon dioxide, and heat;
reacting the carbon dioxide with at least one of a metal and a metal hydride to form at least one of a metal oxide and a metal carbonate;
decomposing hydrogen peroxide in a peroxide reactor to produce high temperature water and oxygen;
separating the high temperature water from the oxygen;
transferring heat from a portion of the high temperature water to at least one solid oxide fuel cell;
recirculating another portion of the high temperature water to the hydride reactor; and
converting the hydrogen and the oxygen in the at least one solid oxide fuel cell to generate electricity and form reaction products comprising steam.

2. The method of claim 1, further comprising directing the reaction products from the at least one solid oxide fuel cell to a turbine to generate additional electricity.

3. The method of claim 1, wherein reacting water with a slurry comprising a metal and a hydrocarbon carrier in a hydride reactor to produce heat, a metal oxide, and hydrogen comprises reacting at least one of magnesium hydride, lithium hydride, and aluminum hydride with the water in the hydride reactor.

4. The method of claim 1, further comprising transferring heat from the steam to the at least one solid oxide fuel cell.

5. The method of claim 1, wherein reacting water with a slurry comprising the metal hydride and a hydrocarbon carrier comprises:
reacting a portion of the water with the metal hydride within the hydride reactor to produce the heat, the metal oxide, and the hydrogen; and
simultaneously reacting another portion of the water with the hydrocarbon carrier within the hydride reactor to produce methane and additional hydrogen.

6. The method of claim 5, wherein converting the hydrogen and the oxygen in the at least one solid oxide fuel cell to generate electricity and form reaction products comprising steam comprises:
directing the hydrogen, the methane, and the additional hydrogen produced within the hydride reactor into the at least one solid oxide fuel cell; and
reacting the hydrogen, the methane, and the additional hydrogen with the oxygen within the at least one solid oxide fuel cell to form the steam and carbon dioxide.

7. A method for producing power, comprising:
reacting water with a slurry comprising a metal hydride and a hydrocarbon carrier in a hydride reactor to produce heat, a metal oxide, and hydrogen;
separating hydrocarbons exiting the hydride reactor;
reacting the hydrocarbons on a catalyst to produce additional hydrogen, carbon dioxide, and heat;
reacting the carbon dioxide with metal particles to produce a metal oxide and thermal energy;
transferring the thermal energy produced from reacting the carbon dioxide with the metal particles to the water used to produce the heat, the metal oxide, and the hydrogen in the hydride reactor;
decomposing hydrogen peroxide in a peroxide reactor to produce high temperature water and oxygen;
separating the high temperature water from the oxygen;
transferring heat from a portion of the high temperature water to at least one solid oxide fuel cell;
recirculating another portion of the high temperature water to the hydride reactor; and
converting the hydrogen and the oxygen in the at least one solid oxide fuel cell to generate electricity and form reaction products comprising steam.

\* \* \* \* \*

UNITED STATES PATENT AND TRADEMARK OFFICE
CERTIFICATE OF CORRECTION

PATENT NO. : 8,697,027 B2  
APPLICATION NO. : 12/546047  
DATED : April 15, 2014  
INVENTOR(S) : Ighor K. Uzhinsky et al.

Page 1 of 1

It is certified that error appears in the above-identified patent and that said Letters Patent is hereby corrected as shown below:

In the claims:
CLAIM 3, COLUMN 11, LINE 37, change "a metal and" to --a metal hydride and--

Signed and Sealed this
Twenty-eighth Day of July, 2015

Michelle K. Lee
*Director of the United States Patent and Trademark Office*